United States Patent [19]
Endo et al.

[11] Patent Number: 5,204,877
[45] Date of Patent: Apr. 20, 1993

[54] SPREAD SPECTRUM MODULATING DEVICE

[75] Inventors: Mamoru Endo; Yoshitaka Uchida, both of Tokyo, Japan

[73] Assignee: Clarion Co., Ltd., Tokyo, Japan

[21] Appl. No.: 829,731

[22] Filed: Jan. 31, 1992

[30] Foreign Application Priority Data

Feb. 7, 1991 [JP] Japan .................. 3-38127

[51] Int. Cl.$^5$ ............................... H04L 27/04
[52] U.S. Cl. ........................................ 375/1
[58] Field of Search ............................. 375/1

[56] References Cited

U.S. PATENT DOCUMENTS

| 4,308,617 | 12/1981 | German, Jr. | 375/1 |
| 4,365,338 | 12/1982 | McRae et al. | 375/12 |
| 4,494,238 | 1/1985 | Groth, Jr. | 375/1 |
| 4,930,140 | 5/1990 | Cripps et al. | 375/1 |
| 5,005,169 | 4/1991 | Bronder et al. | 375/1 |
| 5,056,108 | 10/1991 | Lund | 375/1 |
| 5,063,571 | 11/1991 | Vancraeynest | 375/1 |

Primary Examiner—Gilberto Barron, Jr.
Attorney, Agent, or Firm—Flynn, Thiel, Boutell & Tanis

[57] ABSTRACT

In a spread spectrum modulating device according to the present invention transmission data are converted into parallel data by a serial-parallel converting circuit, which are held by a latch circuit and assign upper digit addresses.

Lower digit addresses in the memory are assigned by a counter.

Parallel data outputted by the memory are converted into analogue signals by a D/A converter, which analogue signals are multiplied by a carrier by a multiplier to obtain a spread spectrum signal.

Owing to the construction described above, a simple and small scale construction can be realized for the spread spectrum modulating device.

4 Claims, 9 Drawing Sheets

CONVOLVER OUTPUT

FIG. 8B

SAMPLING PULSE

FIG. 8C

DEMODULATED DATA

SPREAD SPECTRUM MODULATING DEVICE

FIELD OF THE INVENTION

The present invention relates to a spread spectrum modulating device, and in particular to an improvement of the spread spectrum modulating device having a simple circuit construction capable of multiplexing spread spectrum codes having multi-valued amplitudes.

BACKGROUND OF THE INVENTION

Figure 9:
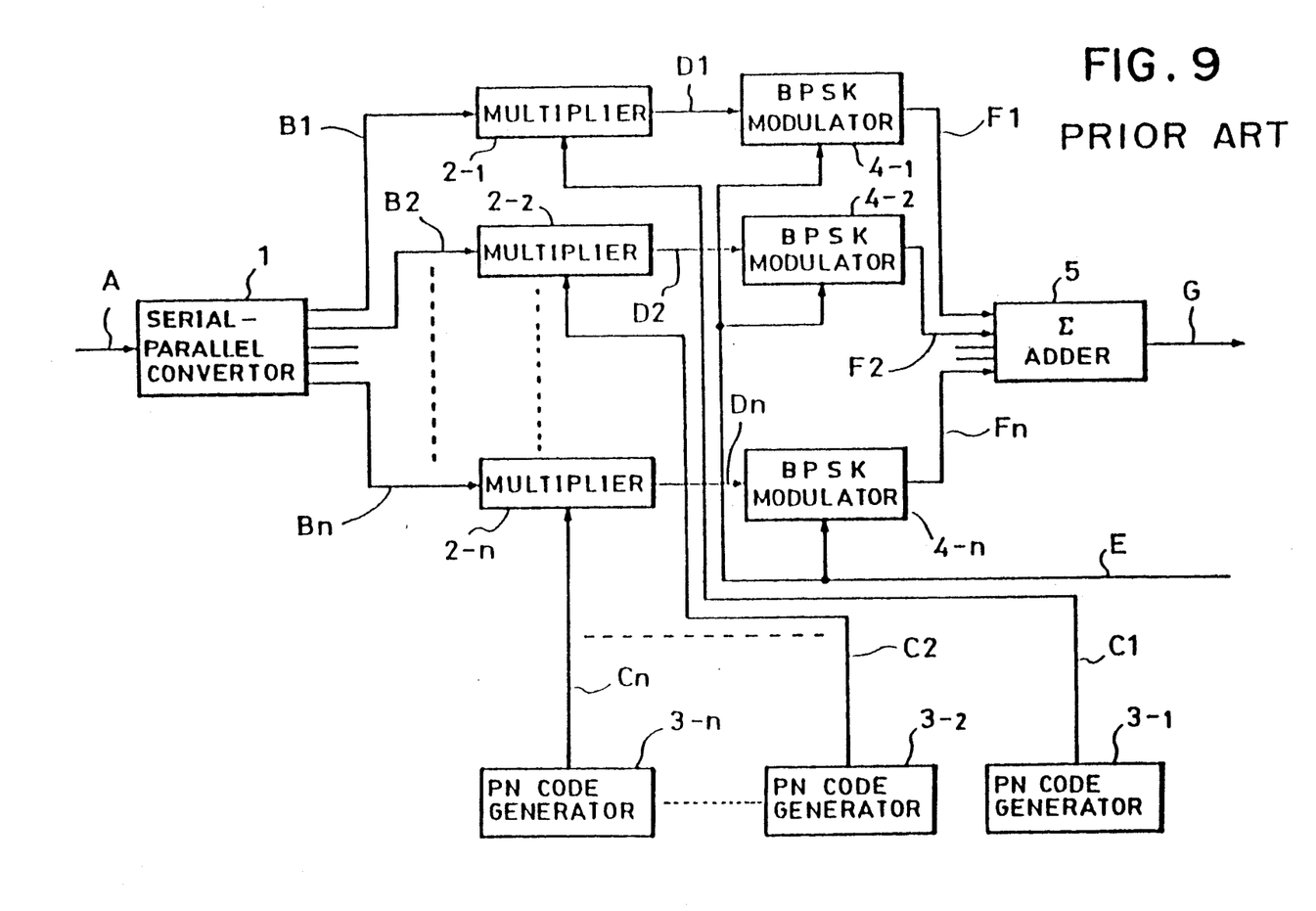
FIG. 9 is a block diagram showing the construction of the transmitter of a prior art SS communication device.
Figure 10:
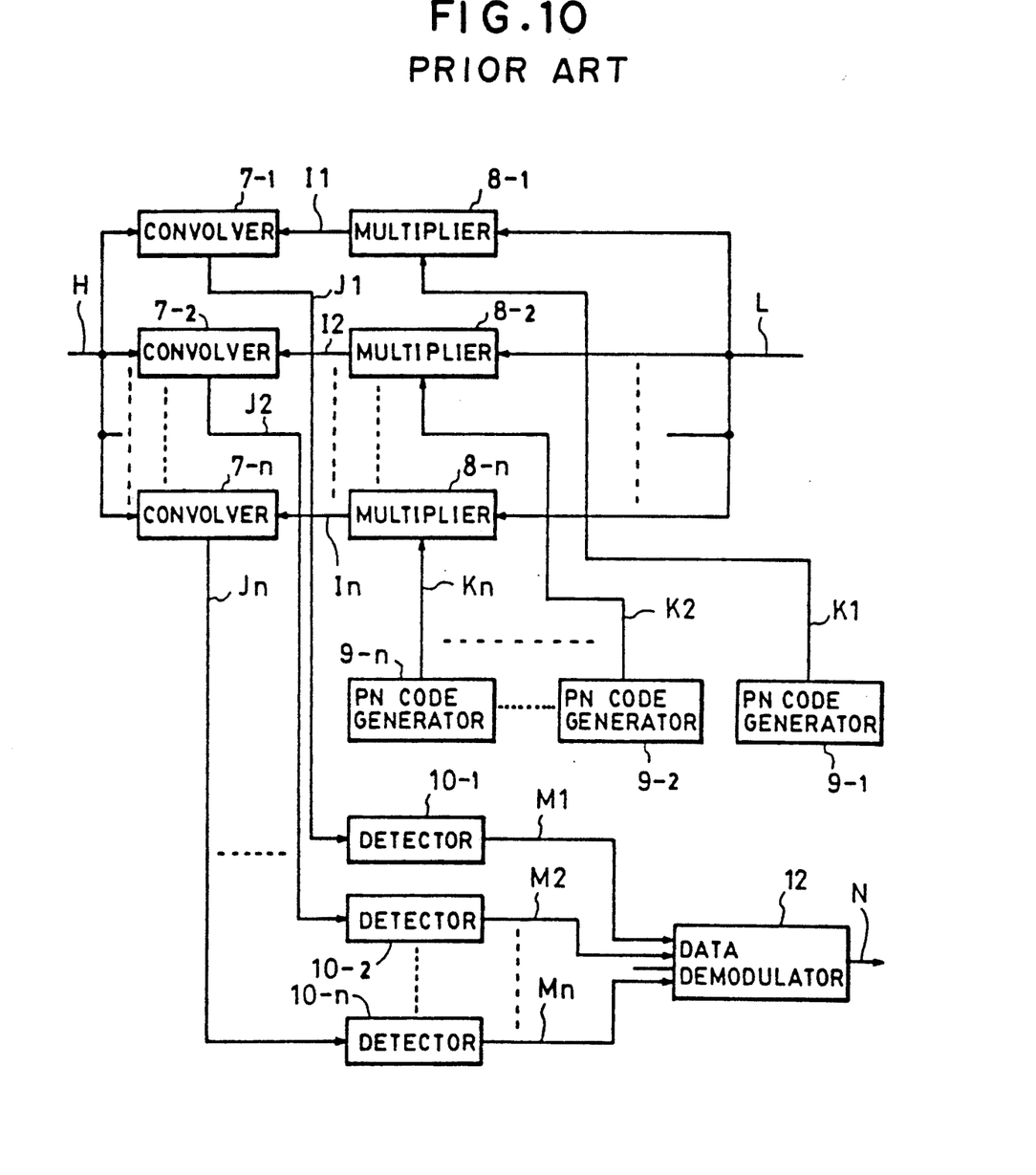
FIG. 10 is a block diagram showing the construction of the receiver of the device stated above.

An example of a prior art multiplex communication device by a spread spectrum communication system effecting high speed data communication is indicated in FIGS. 9 and 10.

FIG. 9 represents a transmitter, in which reference numeral 1 is a serial-parallel converter; 2-1~2-n are multipliers; 3-1~3-n are PN code generators; 4-1~4-n are BPSK modulators; and 5 is an adder.

In the transmitter described above, inputted high speed data A re converted into parallel data sets (B1), (B2), . . . , (Bn) by the serial-parallel converter 1. Each of the parallel data sets (B1), (B2), . . . , (Bn) is inputted to one of the inputs of each of the multipliers 2-1, 2-2, ..., 2-n, respectively. On the other hand, each of different PN codes (C1), (C2), . . . , (Cn) outputted by the PN code generators 3-1, 3-2, . . . , 3-n is inputted to the other input of each of the multipliers 2-1, 2-2, . . . , 2-n, respectively. Outputs (D1), (D2), . . . , (Dn) of the multipliers 2-1, 2-2, . . . , 2-n are inputted to the BPSK modulators 4-1, 4-2, . . . , 4-n, respectively, to modulate a high frequency carrier signal (E). High frequency signals (F1), (F2), . . . , (Fn) are outputted by the BPSK modulators 4-1, 4-2, . . . , 4-n, respectively, to be inputted to the adder 5. A spread spectrum signal (G) n-fold multiplexed is outputted by the adder 5 to be transmitted.

FIG. 10 represents a receiver, in which 7-1~7-n are convolvers; 8-1~8-n are multipliers; 9-1~9-n are PN code generators; 10-1-10-n are detectors; and 12 is a data demodulator.

In the receiver described above, received signal (H) is distributed to the convolvers 7-1, 7-2, . . . , 7-n to be inputted to one of the inputs of each of them.

On the other hand, each of PN codes (K1), (K2), . . . , (Kn) outputted by the PN code generators 9-1, 9-2, . . . , 9-n is applied to one of the inputs of each of the multipliers 8-1, 8-2, . . . , 8-n, respectively. A high frequency carrier signal (L) is inputted to the other input of each of the multipliers 8-1, 8-2, . . . , 8-n. Each of outputs (I1), (I2), . . . , (In) of the multipliers 8-1, 8-2, . . . , 8-n is inputted to the other input of each of the convolvers 7-1, 7-2, . . . , 7-n, respectively.

Outputs (J1), (J2), . . . , (Jn) of the convolvers are inputted to the detectors 10-1, 10-2, . . . , 10-n. At this time, a correlation spike is produced at the output of each of the convolvers from each of data channels with a same timing. Outputs (M1), (M2), . . . , (Mn) of the detectors 10-1, 10-2, . . . , 10-n are inputted to the data demodulator 12. Reproduced data (N) are outputted by the data demodulator 12.

In the prior art multiplex communication device described above, synchronization of the carrier is required and in addition a plurality of convolvers (or matched filters) serving as correlators are necessary.

For this reason a construction described below has been proposed as a spread spectrum multiplex communication device capable of demodulating data by means of a single correlator.

Figure 4:
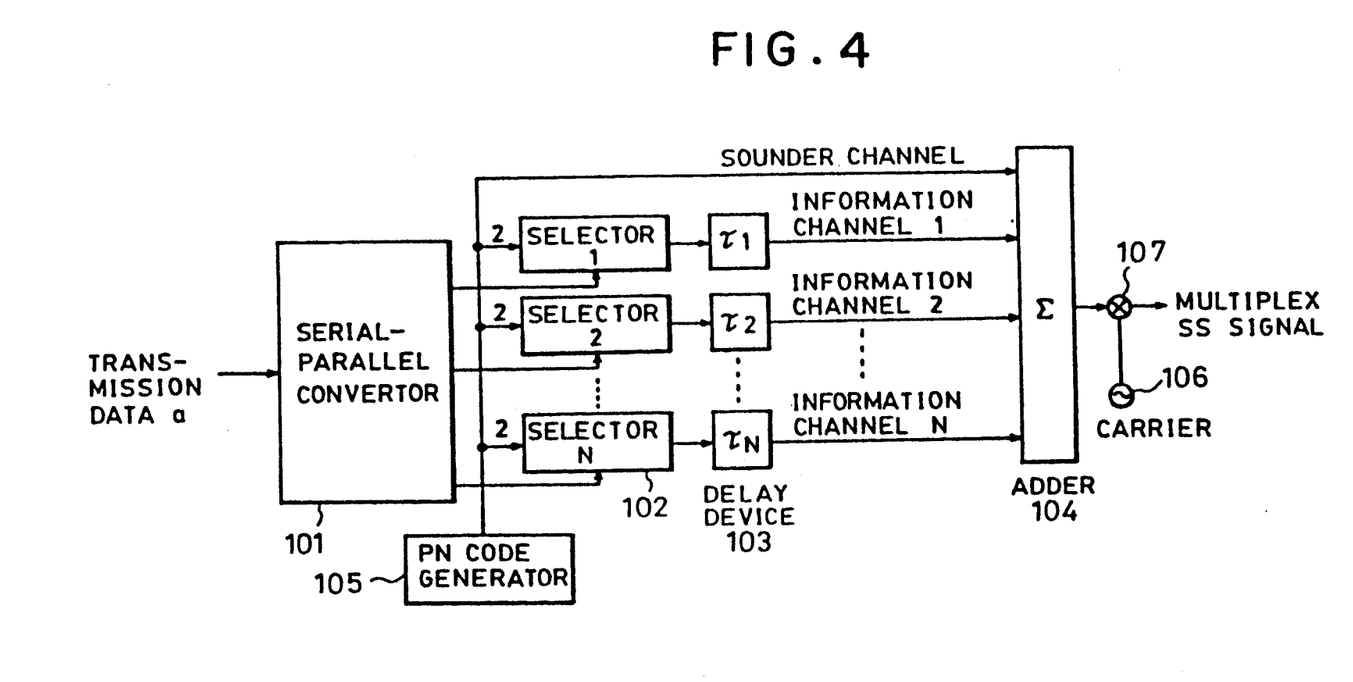
FIG. 4 is a block diagram showing the construction of the transmitter of an SS communication device, which is an object of the improvement according to the present invention.
Figure 5:
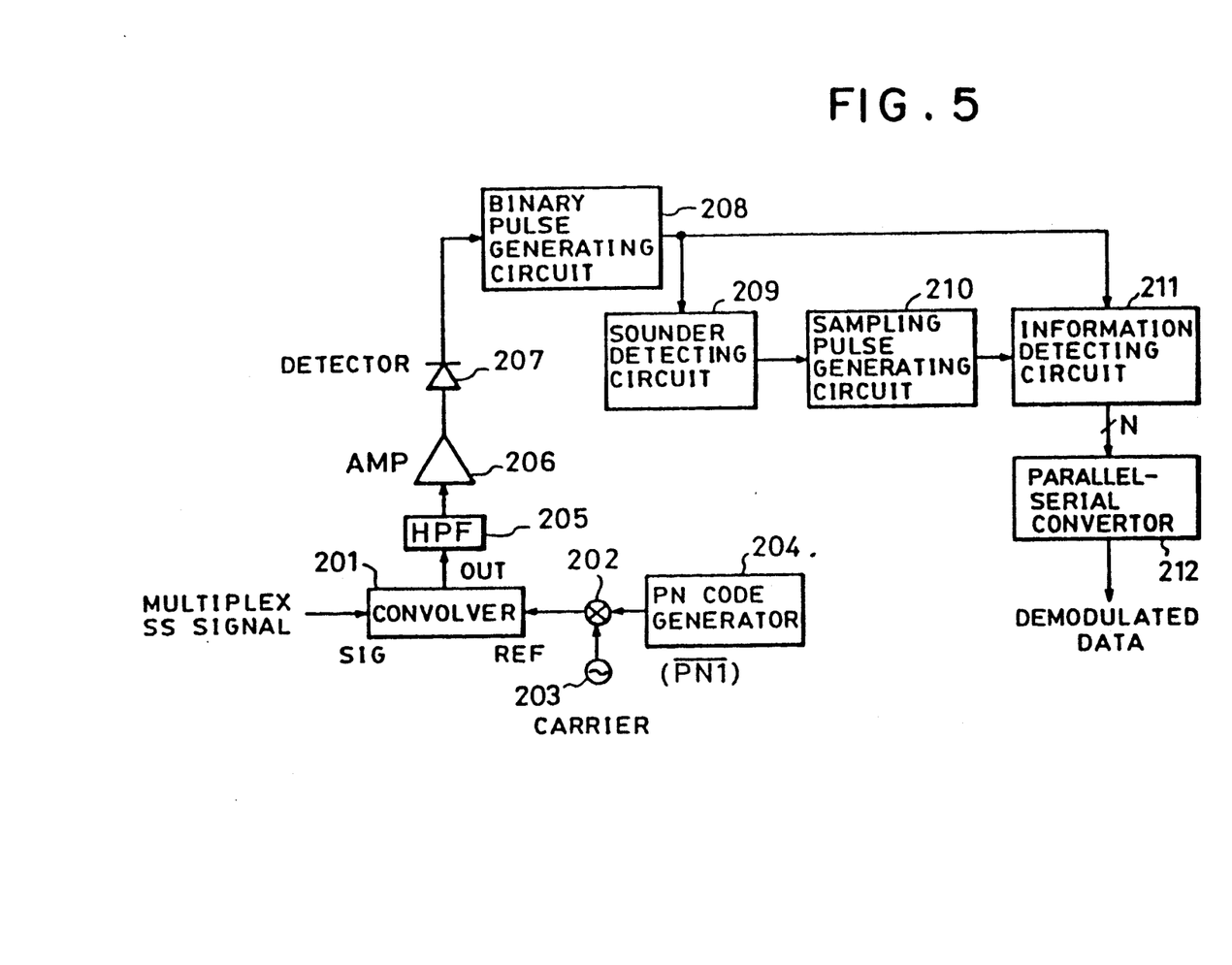
FIG. 5 is a block diagram showing the construction of the receiver of the device stated above.

FIGS. 4 and 5 represent a transmitter and a receiver, respectively, constituting an example of the spread spectrum (SS) communication device described above.

As indicated in FIG. 4, the transmitter is composed of a serial-parallel converting circuit 101, a group of selectors 102, a group of delay devices 103, an adder 104, a PN code generator 105, a high frequency carrier generator 106 and a multiplier 107.

As indicated in FIG. 5, the receiver is composed of a convolver 201 serving as a correlator, a multiplier 202, a high frequency carrier generator 203, a PN code generator 204, a high pass filter (HPF) 205, an amplifier 206, a detector 207, a binary pulse generating circuit 208, a sounder pulse detecting circuit 209, a sampling pulse generating circuit 210, an information detecting circuit 211 and a parallel-serial converting circuit 212.

Now the operation of the device described above will be explained. At first, in the transmitter, transmission data a are converted into signals of a plurality of channels by the serial-parallel converting circuit 101. Here, for the sake of simplifying the explanation, it is supposed that the number of the channels is N. Further the transmission data a are converted into signals having a lower transmission speed by the serial-parallel converting circuit 101 at its outputs. The transmission data a are converted into parallel data having a transmission speed equal to 1/N of the transmission data a or a transmission speed arbitrarily lower than it. The spread spectrum modulation (SS modulation) is effected, depending on the polarity of each of the channels from the serial-parallel converting circuit 101.

The SS modulation described above is carried out e.g. according to either one of following two systems.

1. CSK (Code Shift Keying) system: system, by which two kinds of PN codes (PN1 and PN2) are outputted selectively, depending on the polarity of the data (signal),
2. OOK (On Off Keying) system: system, by which it is selected, depending on the polarity of the data (signal), whether a PN code should be outputted or not.

Figure 6A:
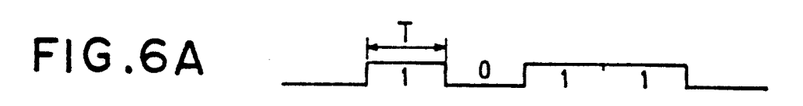
FIGS. 6A, 6B and 6C are diagrams for explaining the operation of the transmitter indicated in FIG. 4.
Figure 6B:
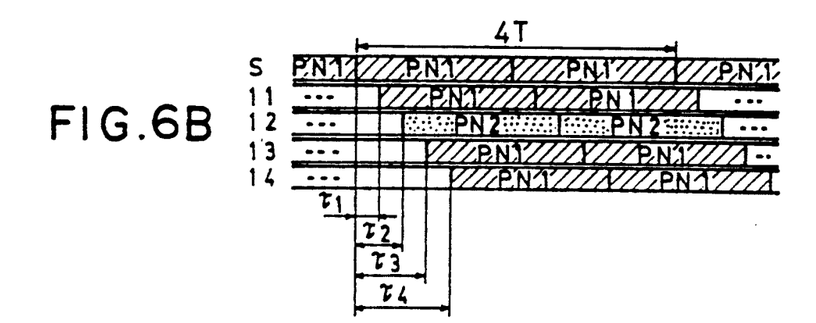
Figure 6C:
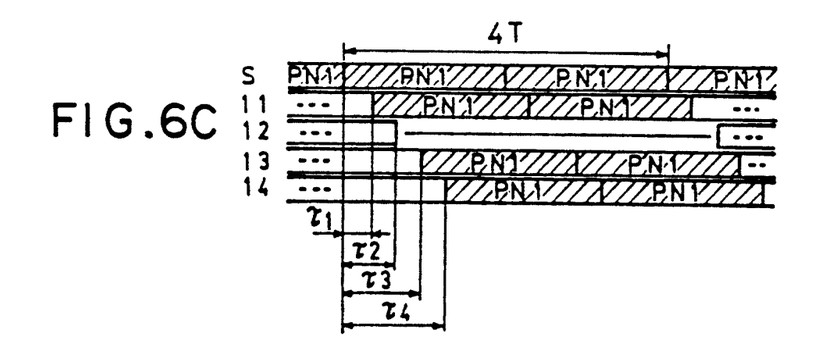

In order to realize the SS modulation operation by the two systems described above, the spread spectrum modulator is constructed by the PN code generator 105 for generating the PN codes (PN1 and PN2) and the group of selectors 102 for effecting the selection described above, depending on each of the outputs of the serial-parallel converting circuit 101. The output of each of the selectors in the spread spectrum modulator is inputted to each delay device of the group of delay devices 103. SS modulated signals (information channels), for which arbitrary amounts of delay different from each other are set, are obtained from the outputs of the delay devices by using the phase of the PN code (here it is supposed to be PN1) of the sounder channel serving as a data demodulating synchronization signal as the reference. This aspect is indicated in FIG. 6. FIG. 6 represents differences between the CSK system and the OOK system for different delay amounts ($\tau_1 \sim \tau_4$), in the case where it is supposed that there are four information channels 11~14. S represents the sounder channel. It represents further that the transmission speed of the transmission data is transformed into a transmission speed lower than it of the different information channels. Here it is transformed into ¼ of the original transmission speed. N SS modulated signals of the information channels obtained by the different delay devices and the signal of the sounder channel are added by the adder 104 in an analogue manner (multiplexing) and the output of the adder 104 is multiplied by the output of the high frequency carrier generator 106 by means of the multiplier 107 to obtain a multiplexed SS signal.

Then, in the receiver, the multiplexed SS signal is inputted to one of the inputs of the convolver 201 as a received signal.

A PN code high-frequency-modulated by multiplying a PN code (here the PN code (PN1), which is in a relation inverted in time with respect to the PN code (PN1) used in the transmitter, is used) by the output of the high frequency carrier generator 203 by means of the multiplier 202 is inputted to the other input terminal of the convolver as a reference signal.

The convolver carries out a correlation operation between the received signal and the reference signal to obtain a high frequency correlation output.

Figure 7:
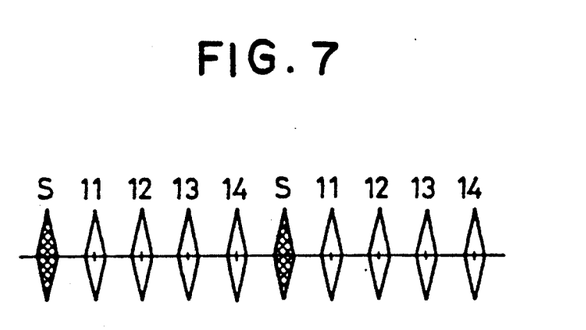
FIG. 7 is a diagram for explaining the operation of the receiver indicated in FIG. 5.

In FIG. 7, correlation peaks separated in time, corresponding to the different PN codes of the different information channels, which are in different phase relations with respect to the phase of the PN code of the sounder channel explained, referring to FIG. 6, are obtained.

Here a state is indicated, where correlation peaks, which are self correlations for the sounder channel and all the information channels, are obtained.

Consequently, in the case where no correlation is obtained for either one of the CSK system and the OOK system (CSK system . . . mutual correlation, OOK system . . . no correlation), no correlation peaks are produced.

Although the device is described for the case where convolvers are used for the correlators, no problem is produced also when matched filters are used therefor.

However the place where the reference signal is generated is replaced by a pattern on the matched filters and therefore it is unnecessary.

Then the output of the convolver is detected by the detector 207 through the high pass filter 205 and the amplifier 206 and converted into a signal in the base band information band to obtain a pulse train of logic level in the binary pulse generating circuit 208.

Further, in the binary pulse generating circuit 208, a threshold value is set so as to be able to separate the correlation peaks from the spurious level in the optimum manner.

Since the correlation output corresponding to the sounder channel produces always periodical correlation peaks, the reference time signal is obtained by detecting the correlation peaks by the sounder pulse detecting circuit 209.

The reason why such a time signal serving as a reference is necessary for making the spread spectrum code synchronization in the usual DS-SS system unnecessary.

That is, the device described above realizes not a system, by which data are reproduced by effecting phase synchronization between the PN code of the received signal and the reference signal on the convolver, but an asynchronous system, in which a mere code synchronizing process is omitted.

Sampling pulses for sampling the correlation pulses corresponding to the different information channels are produced in the sampling pulse generating circuit 210 on the basis of the reference time signal, which is the output of this sounder pulse detecting circuit 209.

Figure 3:
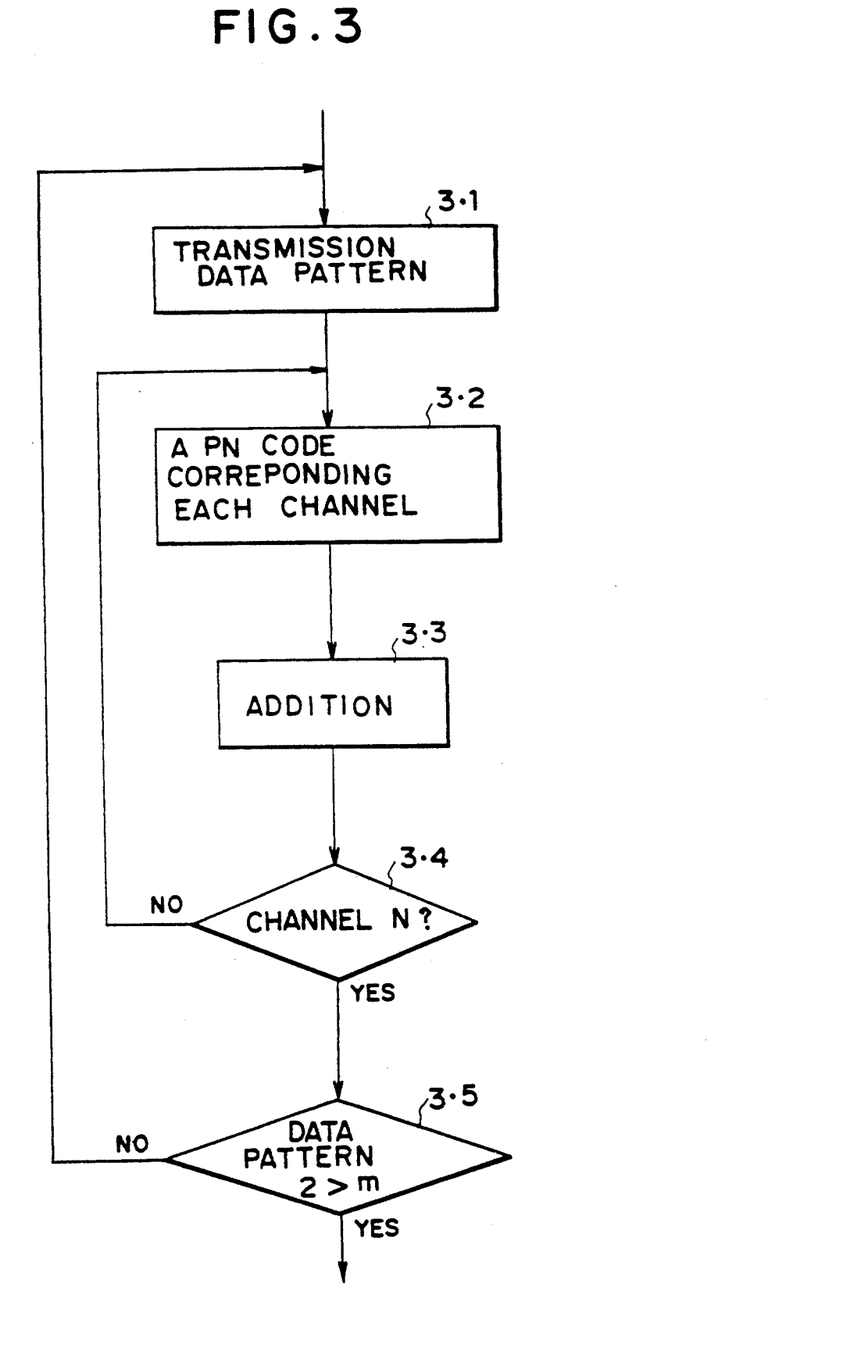
FIG. 3 is a flow chart for explaining how to prepare data to be written in the memory in the embodiment described above.

In the case where convolvers are used for the correlators, since the received signal and the reference signal correspond to each other, the correlation peaks are produced at the gate delay time/2. That is, in this way, the correlation outputs corresponding to the delay amounts ($\tau_1 \sim \tau_4$) of the different information channels with respect to the phase of the PN code of the sounder channel on the transmitter side indicated in FIG. 3 are produced, separated in time also by about ($\tau_1/2 \sim \tau_4/2$).

Consequently the sampling pulses are produced, taking this property described above into account. In this way the data train of each of the information channels is reproduced by sampling the correlation outputs corresponding to the different information channels in the information detecting circuit 211 on the basis of the sampling pulses.

The data obtained here are those having a transmission speed identical to the lower transmission speed after the serial-parallel conversion on the transmitter side.

Then the transmission data are reproduced by converting these N parallel data trains into serial data in the parallel-serial converting circuit 212.

Figure 8A:
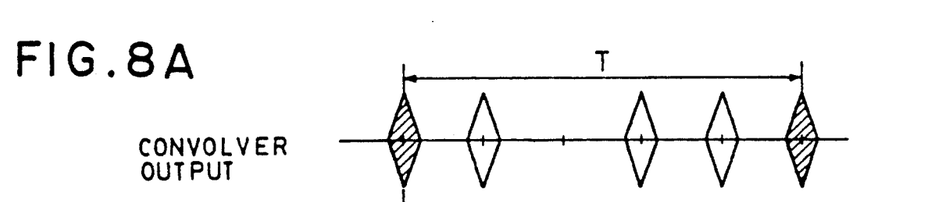
FIGS. 8A, 8B and 8C are another diagrams for explaining the operation of the receiver indicated in FIG. 5.
Figure 8B:
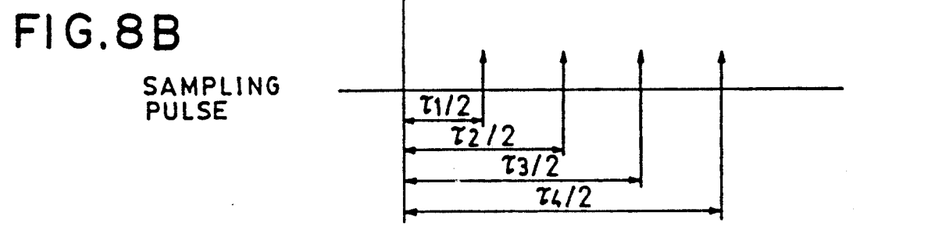
Figure 8C:
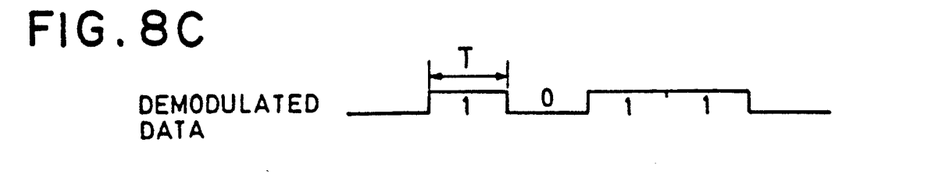

The outline of this series of operations is indicated in FIG. 8.

Since the device described above, in particular the transmitter, uses a group of delay devices, a group of selecting circuits, an adder, etc., it has a problem that the circuit construction is complicated and has a large scale.

OBJECT OF THE INVENTION

The object of the present invention is to provide a spread spectrum modulating device having a simple and small scale circuit construction for the purpose of solving the problem described above.

SUMMARY OF THE INVENTION

In order to achieve the above object, a spread spectrum modulating device according to the present invention comprises a memory for storing and holding a plurality of parallel data sets corresponding to assignments of address and outputting the parallel data sets, responding to assignments of address; serial-parallel converting means for converting serial data to be transmitted into parallel data and assigning predetermined addresses among addresses in the memory; a counter for assigning remaining addresses among the addresses in the memory by counting clocks and outputting a count value thus obtained; a D/A converter for D/A converting parallel data outputted by the memory; and a modulator for modulating a carrier with an analogue signal analogue-converted by the D/A converter.

The serial data to be transmitted are converted into the parallel data and the upper digit addresses in the memory are assigned by these parallel data. The address length of the lower digit addresses in this memory corresponds to one period of the spread spectrum code and it is assigned by the output of the counter.

The parallel data outputted by the memory stated above are D/A-converted and a carrier is modulated with the converted analogue signal to obtain the multiplexed spread spectrum modulated signal.

DETAILED DESCRIPTION

Hereinbelow the embodiment of the present invention indicated in the drawings will be explained.

Figure 1:
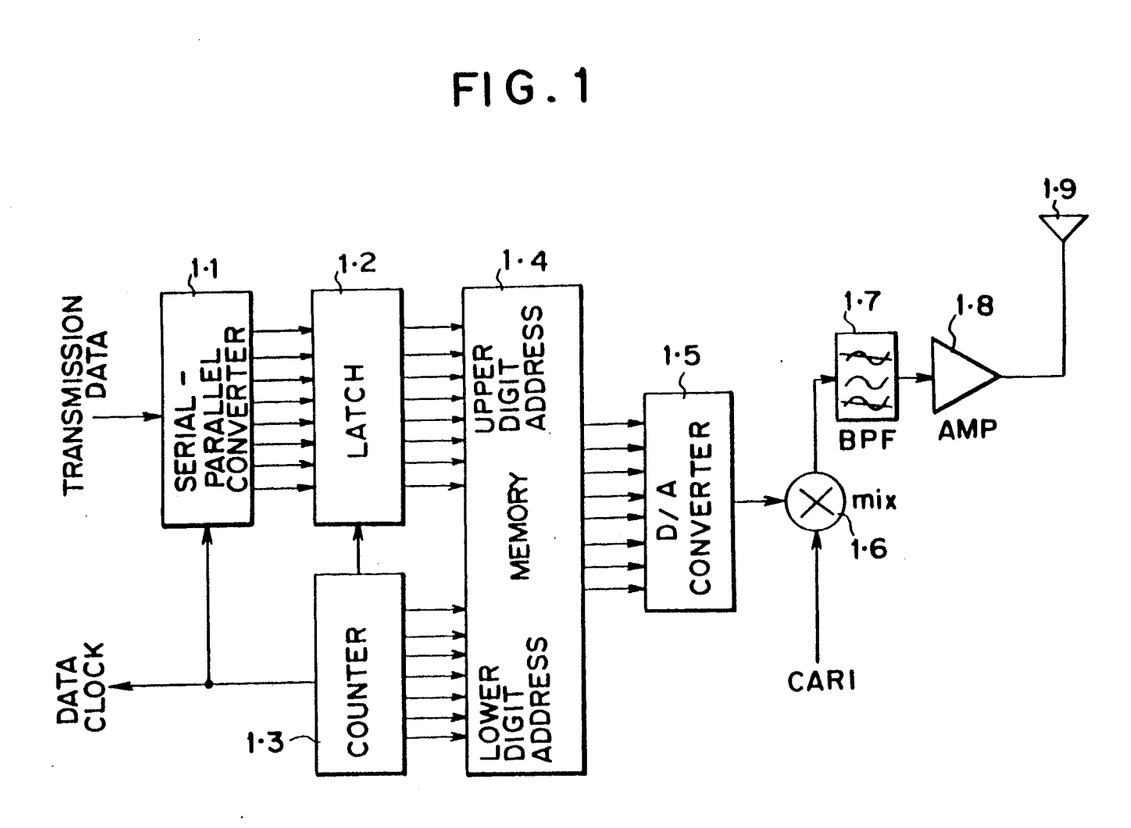
FIG. 1 is a block diagram showing an embodiment of the present invention.

FIG. 1 shows an embodiment of the transmitter of the spread spectrum modulating system according to the present invention, in which reference numeral 11 is a serial-parallel converting circuit; 12 is a data latch circuit; 13 is a counter; 14 is a memory; 15 is a D/A converter; 16 is a multiplier; 17 is a band pass filter (BPF); 18 is an amplifier; and 19 is an antenna.

The counter 13 is provided with a clock oscillator therein and counts up output clocks thereof from 0 to 127. The count value is outputted successively to assign lower digit addresses in the memory 14. Further, when the count value arrives at 127, a latch clock signal is outputted to the latch circuit 12. The latch circuit 12 cleans held data, responding to this signal, which are replaced by succeedingly inputted data.

Further parallel data corresponding to the outputs of the adder stated above corresponding to all the data sets of combination from 0000 to 1111 conceivable as transmission data in the transmitter indicated in FIG. 4 are stored in the memory 14.

Consequently, when upper digit addresses and lower digit addresses in the memory 14 are assigned, it is possible to output the stored parallel data, responding thereto. The addresses length of these lower addresses is set so as to be equal to one period of the spread spectrum code.

In the transmitter having the construction described above, serial data to be transmitted are converted into parallel data by the serial-parallel converting circuit 11. After these parallel data have been latched by the latch circuit 12, the upper digit addresses in the memory 14 are assigned by using the latched data. At this time the addresses indicate a state of the data.

The lower digit addresses in the memory 14 are assigned by the count output of the counter 13.

Parallel data of the multiplexed code are outputted from the memory 13, responding to the address assignment of the memory 13 described above, and converted into an analogue signal by the D/A converter 15. This analogue signal is multiplied by the carrier by the multiplier 16 to be modulated and the spread spectrum modulated signal thus obtained is transmitted by the antenna 19 through the BPF 17 and the amplifier 18.

Figure 2A:
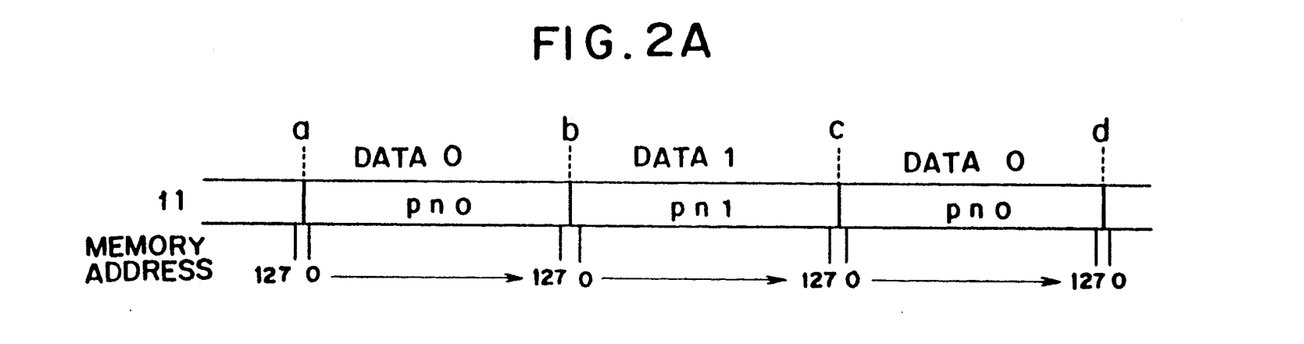
FIGS. 2A and 2B are diagrams for explaining the operation of the embodiment stated above.

FIG. 2a indicates an assignment state of the memory, in the case where the address assignment of the memory described above is effected provisionally in the same way as that used in the prior art serial data transmission system. However, in the figure, the spread spectrum code is of 127 chips and one bit length of the data is equal to one period length of the spread spectrum code (pn).

The lower digit addresses in the memory 14 are assigned from 0 to 127 by the counter 13. At this time, when the upper digit address in the memory 14 is 1, a data address of pn1 is assigned, and on the contrary, when it is 0, a data address of pn0 is assigned for the spread spectrum code.

Figure 2B:
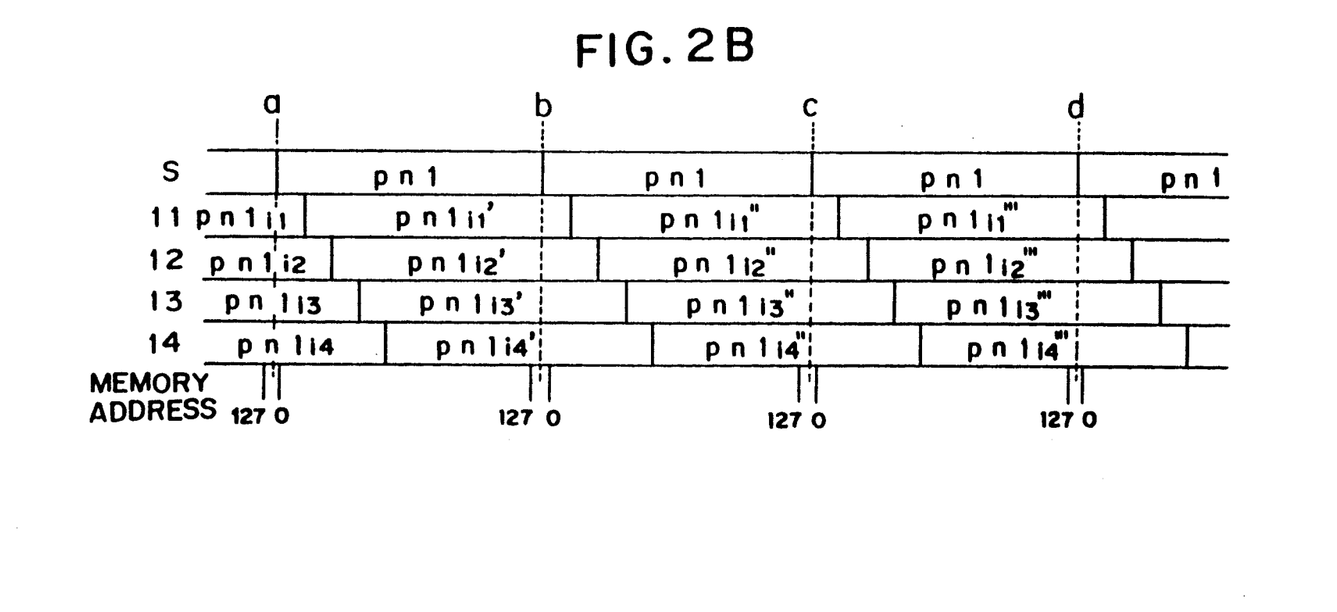

In this way, it is possible to make variation points of the data correspond to interruptions (a, b, c, d, . . .) of the lower digit addresses. However, in the multi-plexing, as indicated in FIG. 2b, since the transmission of the multiplexing code data is effected by delaying codes corresponding to the different data sets, the variation points of the data are not in accordance with the interruptions of the lower digit addresses and it is impossible to transmit different spread spectrum code corresponding to all the data sets in one period length of the code. Therefore the multiplexing code should be selected, taking the preceding transmission data into account.

However such a problem can be solved according to the present invention. For example, in FIG. 2b, it is supposed that the code length is 127 and that the lower digit addresses in the memory are 0~127, using the period of the spread spectrum code of the sounder S as the reference. The sounder is represented by S and the information channels corresponding to different data sets are indicated by I1~I4.

When the transmission data are represented by xxxx 1111 1010 0000 . . . (x indicating undetermined data), in a section a~b, corresponding spread spectrum codes are assigned as $pn1_{11}=x$, $pn1_{12}=x$, $pn1_{13}=x$, $pn1_{14}=x$, $pn1_{11'}=1$, $pn1_{12'}=1$, $pn1_{13'}=1$, $pn1_{14'}=1$.

Next, in a section b~c, corresponding spread spectrum codes are assigned as $pn1_{11'}=1$, $pn1_{12'}=1$, $pn1_{13'}=1$, $pn1_{14'}=1$, $pn1_{11''}=1$, $pn1_{12''}=0$, $pn1_{13''}=1$, $pn1_{14''}=0$. Then the codes can be transmitted continuously at the variation points.

As described above, the multiplexing code can be produced, using the memory 14, by assigning the addresses on the basis of preceding and succeeding data as transmission data "xxxx 1111" for a section a~b, transmission data "1111 1010" for a section b~c, and transmission data "1010 0000" for a section c~d.

This operation is effected by the serial-parallel converting circuit 11 for the transmission data.

Next the method for forming the data, which are to be written in the memory 14, will be explained, referring to the flow chart indicated in FIG. 3. This flow chart shows steps for executing the operation indicated in FIG. 4 by means of a computer. Step 31 in FIG. 3 corresponds to the operation of the parallel-serial converting circuit 101. However in Step 31, as described previously, the number of information sets of the transmission data in one period of the code should be twice as great as the number of information channels.

For this reason, e.g. in the case where there are four information channels, as indicated in FIG. 2b, there exist $2^8=256$ transmission data patterns from "0000 0000" to "1111 1111".

Next in Step 32 in FIG. 3, the operations of the selectors 102 and the delay devices are carried out. These are spread spectrum codes pn 1, 0 corresponding to the data 1, 0 and transmission data patterns "$D_{11}$, $D_{12}$, $D_{13}$, $D_{14}$, $D_{21}$, $D_{22}$, $D_{23}$, $D_{24}$" as well as delay amounts "$\tau_1$, $\tau_2$, $\tau_3$, $\tau_4$" corresponding to the different information channels are set.

In the case where the code of the information channel I1 is formed, at first the code of one period of the information channel I1 is formed on the basis of data "$D_{11}$, $D_{21}$" and delay amounts "$\tau_1$".

Next, in Step 33 in FIG. 3, the data sets of the different information channels, for which code data of information channel are pooled, and the sounder channel are added. This operation corresponds to the operation of the adder 104 in FIG. 4.

In Step 34 of FIG. 3, the process described above is repeated, depending on the number of the sounder channel and the different information channels and in Step 35, it is repeated number of times of the data patterns.

As explained above, according to the present invention, in a spread spectrum modulating device, since memories are used instead of delay devices, selectors and an adder, the circuit scale can be reduced.

Further, since a carrier can be modulated with modulating codes obtained by addition in the base hand, the circuit construction is simple.

Furthermore, since memories and D/A converters are used, it is possible to multiplex spread spectrum codes having multi-valued amplitudes (multi-phase period series, etc.) by increasing the number of bits of these memories and the D/A converters.

What is claimed is:

1. A spread spectrum modulating device comprising:
   a memory for storing and holding a plurality of parallel data sets corresponding to assignments of address and outputting said parallel data sets, responding to assignments of address;
   serial-parallel converting means for converting serial data to be transmitted into parallel data and assigning predetermined addresses among addresses in said memory;
   a counter for assigning remaining addresses among the addresses in said memory by counting clock pulses and outputting a count value thus obtained;
   a D/A converter for D/A converting parallel data outputted by said memory; and
   a modulator for modulating a carrier with an analogue signal analogue-converted by said D/A converter.

2. A spread spectrum modulating device according to claim 1 wherein said predetermined addresses are upper digit addresses and said remaining addresses are lower digit addresses.

3. A spread spectrum modulating device according to claim 1 wherein said counter includes clock generating means and outputs a latch clock signal, when the count value reaches a predetermined value, and further said serial-parallel converting means is provided with a latch circuit, which latches the converted parallel data when said latch clock signal has a predetermined logical state.

4. A spread spectrum modulating device according to claim 2 wherein a length of said lower digit addresses in said memory is set so as to correspond to one period of a spread spectrum code.

* * * * *